Patented Feb. 5, 1946

2,394,347

UNITED STATES PATENT OFFICE 2,394,347

POLYMERIZATION OF CHLOROPRENE

Frank N. Wilder, Louisville, Ky., assignor to E. I. du Pont de Nemours & Company, Wilmington, Del., a corporation of Delaware No Drawing. Application October 31, 1942, Serial No. 464,081

4 Claims. (Cl. 260—92.7)

This invention relates to the polymerization of chloroprene (2-chloro-1,3-butadiene) and more particularly to regulating and accelerating such polymerization in aqueous dispersions, by controlling the extent of contact of the polymerizing system with oxygen.

Many catalysts are known for the polymerization of chloroprene, among them being peroxides and salts of per-acids. There are, however, definite limits to the acceleration which is practically obtainable by means of these substances. Moreover, in many cases, the acceleration is only temporary and a great decrease in rate occurs toward the end of the polymerization with the result that in many cases satisfactory yields can not be obtained in any reasonable length of time. It is obvious that the acceleration of polymerization and the achievement of maximum yields is of great importance, particularly where the resulting products are vital war materials, such as, for example, the various types of synthetic rubber. In addition to increasing production, improved methods for accelerating polymerization are also much needed in many cases where a lower temperature of polymerization would have desirable effects upon the properties of the product but where the polymerization is excessively slow by previous methods at these lower temperatures. Furthermore, a method for retarding the early stages of the polymerization but accelerating the later stages would be valuable where the polymerization as at present carried out liberates large amounts of heat in its early stages. No general satisfactory method is now available for accelerating the polymerization during these last stages, since in general the addition of the active polymerization catalysts such as persulfates during the course of the emulsion polymerization tends to cause coagulation.

It is, therefore, an object of the present invention to provide an improved method for controlling the polymerization of chloroprene in aqueous dispersion. Another object is to provide a method for rapid polymerization to a practically quantitative yield. A further object is to provide a method for retarding the early stages and accelerating the later stages of emulsion polymerization. Other objects will appear hereinafter.

It has been found that these objects are accomplished in the case of chloroprene emulsions containing sulfur by regulating the extent of contact of the polymerizing dispersion with oxygen. Contrary to the effect observed in the massive polymerization of chloroprene, the rate of polymerization varies here inversely with the extent of contact with oxygen, that is, the greater the contact, the slower the polymerization. The extent of contact is increased by increasing the oxygen content of the gas in contact with the polymerizing dispersion and by other methods described in detail below.

In order that the process may be more fully understood, the following specific examples are given by way of illustration, but the invention is not limited thereto as will become more apparent hereinafter.

Example I

One hundred (100) parts of chloroprene containing in solution 4 parts of rosin and 0.6 part of sulfur was emulsified in 190 parts of water containing 0.8 part of sodium hydroxide, 1 part of ammonium persulfate, and 0.75 part of the sodium dinaphthylmethane sulfonates prepared according to U. S. Patent No. 1,336,759. These solutions and the resulting emulsions were kept out of contact with oxygen by maintaining a nitrogen atmosphere over their exposed surfaces. While still maintaining an atmosphere of nitrogen over the emulsion, it was allowed to polymerize at 10° C. with agitation and suitable heating or cooling of the reaction vessel to maintain this temperature. After 17 hours, the resulting latex was treated with 2.5 parts of tetraethyl thiuram disulfide in the form of an aqueous dispersion. It was then made slightly acid with acetic acid and coagulated by freezing in the form of a thin sheet on a rotating refrigerated drum as described in U. S. Patent No. 2,187,146. This sheet was afterwards washed and dried in a current of warm air and compressed into the form of a rope for packaging and shipment. The yield of product was 98%. When the polymerization was carried out under an atmosphere of air but with other conditions the same, only 58% of product was formed in the same time, while under an atmosphere of oxygen still less was formed.

Example II

One hundred (100) parts of chloroprene containing 0.6 part of sulfur was emulsified in 226 parts of water containing 0.22 part of hydrogen chloride, 0.5 part of ammonium persulfate, 4 parts of the sodium salts of the sulfate esters of a mixture of straight chain primary alcohols having an average chain length of 13 carbon atoms and 0.5 part of the sodium dinaphthylmethane sulfonates prepared according to U. S. Patent No. 1,336,579. Oxygen was excluded by the use of an atmosphere of nitrogen as in Example I and the polymerization was carried out at 10° C. with rapid agitation. At the end of about 3.5 hours the dispersion was treated with tetraethyl thiuram disulfide as in Example I and was then coagulated by the addition of saturated sodium chloride solution. After washing with water on a corrugated mill and then milling on a warm mill to dry the product, the yield of product was found to be 100%. For comparison, when the polymerization was carried out under an atmosphere of oxygen, scarcely any polymerization took place in this time, while under air the polymerization was much reduced as compared with the process using nitrogen.

Example III

This example illustrates the regulation of polymerization by varying the nature of the atmosphere in contact with the material. A dispersion of chloroprene similar to that prepared in Example I but containing one part of potassium persulfate instead of ammonium persulfate was agitated at 40° C. under an atmosphere of air at such a speed that air was beaten into the body of the liquid, thus affording good contact. The reaction vessel was open so that fresh air was constantly supplied to the system. Scarcely any polymerization took place in one hour. Nitrogen was then introduced continuously over the surface and was introduced into the body of the dispersion by agitation. After 20 minutes, polymerization started and proceeded to the extent of 54% in the next hour. The nitrogen was then replaced by air which again rapidly stopped the polymerization. The introduction of nitrogen again started the polymerization with continued toward completion at a good rate as long as the nitrogen atmosphere was maintained.

Intermediate rates of polymerization were obtained by using an atmosphere of air but less vigorous agitation and therefore less thorough contact between the liquid and vapor phases or by using mixtures of nitrogen and air, thus reducing the proportions of oxygen.

Example IV

This example illustrates the use of potassium ferricyanide in place of a persulfate. Chloroprene was polymerized as in Example I using an atmosphere of nitrogen, but with the persulfate replaced by 0.4 part of potassium ferricyanide. The yield was 93.5% in 4 hours. When, however, an atmosphere of air was maintained above the dispersion but the conditions were otherwise the same, scarcely any polymerization took place.

The extent of contact of the polymerizing emulsions with oxygen can be varied as illustrated in the examples by varying the concentration of oxygen in the gas phase in contact with the emulsion and by varying the extent of contact between the liquid and gas phases. The concentration of the oxygen can be varied by varying the pressure and by dilution with another gas. Although nitrogen is used for this purpose in the examples and is in general preferred because of its ready availability, relatively low rate of diffusion, non-inflammability, etc., other non-oxidizing gases can be used, such as hydrogen, methane, and other hydrocarbons, and the so-called rare gases such as helium or argon. One method of operating in absence of oxygen is to operate in a closed system containing no vapor space or a vapor space which has been evacuated so as to contain only the vapor of water and the material undergoing polymerization. The extent of contact with oxygen also depends upon the area of the interface between liquid and gas phases and also upon the circulation in these phases, particularly the liquid phase. The agitation of the liquid phase is therefore of great importance, both as regards the type of agitation employed and its speed. Contact with the gaseous phase can also be increased by introducing a stream of the gas below the surface of the liquid.

In general, for the most rapid polymerization, it is desirable to decrease the proportion of molecular oxygen present in the gas in contact with the dispersion to less than about 1.0 per cent. Preferably the molecular oxygen is substantially excluded from the gas, i. e., reduced below about 0.002%.

Where no acceleration is desired during the earlier part of the polymerization, removal of the oxygen from contact with the reaction mixture can be delayed until the earlier part of the reaction is over and then the latter part of the reaction can be carried out with less oxygen than the earlier part. This can be accomplished by sweeping the reaction zone with nitrogen or other inert gas, such as those enumerated above.

Where it is desired to substantially exclude oxygen from the reaction zone during the entire reaction, the emulsifying solution can be boiled before adding the chloroprene and then kept out of contact with air. The precautions taken for excluding oxygen from the emulsion consist of passing the nitrogen or other inert gas through alkaline sodium hydrosulphite solution or similar agent to remove traces of oxygen, boiling the aqueous emulsifying solution to remove oxygen before use, and carrying out of the polymerization in vessels in which the gas phase is entirely enclosed except for an inlet for the purified nitrogen and an outlet through which it may be allowed to escape at a rate of flow much greater than the rate at which oxygen would diffuse into the system. It is not practical, however, to assure complete absence of oxygen during the preparation, purification, and transfer of the chloroprene or to remove the peroxide and similar oxidation products from the chloroprene as outlined above. However, the amount of molecular oxygen, present in the chloroprene, if any, is so small that it is negligible insofar as the present invention is concerned. This is clearly apparent when it is realized that the polymerization can be accelerated by removing oxygen from the gaseous phase of the reaction zone without special treatment of the aqueous phase, as illustrated by Example III.

The present invention is applicable to the polymerization of the chloroprene in aqueous dispersions, in the presence of sulfur in amounts preferably between 0.1% by weight of the chloroprene present up to the total amount soluble in chloroprene under the conditions of the polymerization, which is usually about 2% of the weight of the chloroprene. It is preferred to carry out the polymerization in the presence of a water-soluble persulfate or a water-soluble ferricyanide, although the regulating effect of the extent of contact with oxygen is also observed when other polymerization catalysts are used or even when the polymerization is carried out in the absence of added catalysts. The preferred proportions of persulfate are between 0.1% and 1% and of ferricyanide between 0.01 and 1%, based on the amount of chloroprene used. The preferred emulsifying system is an alkaline sodium abietate solution made by dissolving rosin in an excess of a strong alkali as in Example I. Preferably also, this solution contains a stabilizing agent such as the sodium dinaphthylmethane sulfonates used in this example. It is also sometimes advantageous, as illustrated in Example II, to use an acid solution for emulsification and to use other types of emulsifying agents. The form of sulfur used, the methods for introducing it into the polymerization system, types of emulsifying agents, methods of forming emulsions and of coagulating the polymerized dispersions, methods of stabilizing, plasticizing, washing and drying the polymer, and finally compounding, curing, and utilizing these products, has already been discussed in U. S. Patent No. 2,264,173, to which reference is here made. The disclosure of said patent is applicable to the present invention. Such features as the temperature of polymerization, the concentration of the dispersion and the concentration of the emulsifying agents are not critical, although it is pointed out that the more rapid polymerization obtainable when oxygen is excluded according to the present invention often makes it possible to obtain a high yield of polymer in a reasonable length of time by operating at a considerably lower temperature than would normally be used. This polymerization at low temperature considerably improves the working properties of the product.

It is apparent that many widely different embodiments of this invention may be made without departing from the spirit and scope thereof, and, therefore, it is not intended to be limited except as indicated in the appended claims.

I claim:

1. In the process for polymerizing 2-chloro-1,3-butadiene in aqueous emulsion in the presence of a quantity of sulfur ranging from about 0.1% of the weight of the 2-chloro-1,3-butadiene to about the amount soluble in the 2-chloro-1,3-butadiene under the conditions of polymerization and wherein the polymerization is carried out under agitation, the steps which comprise starting the polymerization in contact with normal atmospheric oxygen and thereafter increasing the rate of polymerization by decreasing the amount of molecular oxygen in contact with the polymerization mass, the polymerization being brought to completion in the substantial absence of molecular oxygen in contact with the polymerization mass.

2. In the process for polymerizing 2-chloro-1,3-butadiene in aqueous emulsion in the presence of a quantity of sulfur ranging from about 0.1% of the weight of the 2-chloro-1,3-butadiene to about the amount soluble in the 2-chloro-1,3-butadiene under the conditions of polymerization and wherein the polymerization is carried out under agitation, the steps which comprise starting the polymerization in contact with normal atmospheric oxygen and thereafter increasing the rate of polymerization by decreasing the amount of molecular oxygen in contact with the polymerization mass, the polymerization being brought to completion in the substantial absence of molecular oxygen in contact with the polymerization mass, the decrease in the amount of molecular oxygen in the mass being brought about by sweeping out the air in the reaction vessel with an inert gas.

3. In the process for polymerizing 2-chloro-1,3-butadiene in aqueous emulsion in the presence of a polymerization catalyst and a quantity of sulfur ranging from about 0.1% of the weight of the 2-chloro-1,3-butadiene to about the amount soluble in the 2-chloro-1,3-butadiene under the conditions of polymerization and wherein the polymerization is carried out under agitation, the steps which comprise starting the polymerization in contact with normal atmospheric oxygen and thereafter increasing the rate of polymerization by decreasing the amount of molecular oxygen in contact with the polymerization mass, the polymerization being brought to completion in the substantial absence of molecular oxygen in contact with the polymerization mass.

4. In the process for polymerizing 2-chloro-1,3-butadiene in aqueous emulsion in the presence of a polymerization catalyst and a quantity of sulfur ranging from about 0.1% of the weight of the 2-chloro-1,3-butadiene to about the amount soluble in the 2-chloro-1,3-butadiene under the conditions of polymerization and wherein the polymerization is carried out under agitation, the steps which comprise starting the polymerization in contact with normal atmospheric oxygen and thereafter increasing the rate of polymerization by decreasing the amount of molecular oxygen in contact with the polymerization mass, the polymerization being brought to completion in the substantial absence of molecular oxygen in contact with the polymerization mass, the decrease in the amount of molecular oxygen in the mass being brought about by sweeping out the air in the reaction vessel with an inert gas.

FRANK N. WILDER.